(12) United States Patent
Matschullat

(10) Patent No.: US 8,092,572 B2
(45) Date of Patent: Jan. 10, 2012

(54) METHOD OF REGULATING THE OUTPUT OF CARBON MONOXIDE IN A METALLURGICAL MELTING PROCESS

(75) Inventor: Thomas Matschullat, Eckental (DE)

(73) Assignee: Siemens Aktiengesellschaft, Munich (DE)

( * ) Notice: Subject to any disclaimer, the term of this patent is extended or adjusted under 35 U.S.C. 154(b) by 60 days.

(21) Appl. No.: 12/446,998

(22) PCT Filed: Aug. 30, 2007

(86) PCT No.: PCT/EP2007/059061
§ 371 (c)(1),
(2), (4) Date: Nov. 18, 2009

(87) PCT Pub. No.: WO2008/049673
PCT Pub. Date: May 2, 2008

(65) Prior Publication Data
US 2010/0071508 A1    Mar. 25, 2010

(30) Foreign Application Priority Data
Oct. 27, 2006 (DE) .......................... 10 2006 050 888

(51) Int. Cl.
*C21C 5/30* (2006.01)
*C21C 5/56* (2006.01)
(52) U.S. Cl. ................ 75/384; 75/385; 75/387
(58) Field of Classification Search .......... 75/387, 75/385
See application file for complete search history.

(56) References Cited

U.S. PATENT DOCUMENTS

| 4,512,802 A | 4/1985 | Tohge | 75/60 |
| 5,246,482 A * | 9/1993 | Murakami et al. | 75/378 |
| 6,171,364 B1 * | 1/2001 | Sarma et al. | 75/382 |
| 2004/0182203 A1 * | 9/2004 | Nakao et al. | 75/378 |

FOREIGN PATENT DOCUMENTS

| DE | 3311232 | 10/1984 |
| DE | 4217933 | 12/1993 |
| WO | 02/075003 | 9/2002 |

OTHER PUBLICATIONS

German Office Action, German application No. 10 2006 050 888.2-24, 3 pages.
German Office Action, German application No. 10 2006 050 888.2-24, 2 pages.
Ukraine Office Action, Ukraine application No. a200904013, 3 pages.

* cited by examiner

*Primary Examiner* — George Wyszomierski
*Assistant Examiner* — Tima M McGuthry Banks
(74) *Attorney, Agent, or Firm* — King & Spalding L.L.P.

(57) ABSTRACT

In a method of regulating the output of CO in steel production, oxygen is introduced into a melt to remove carbon present, the actual value of the carbon stream evolved from the melt is determined, the intended value of the evolved carbon stream derived from the amount of oxygen introduced and the carbon content of the melt is calculated, intended and actual values are compared with one another and if the actual value is below the intended value, measures for preventing boiling are undertaken.

3 Claims, 3 Drawing Sheets

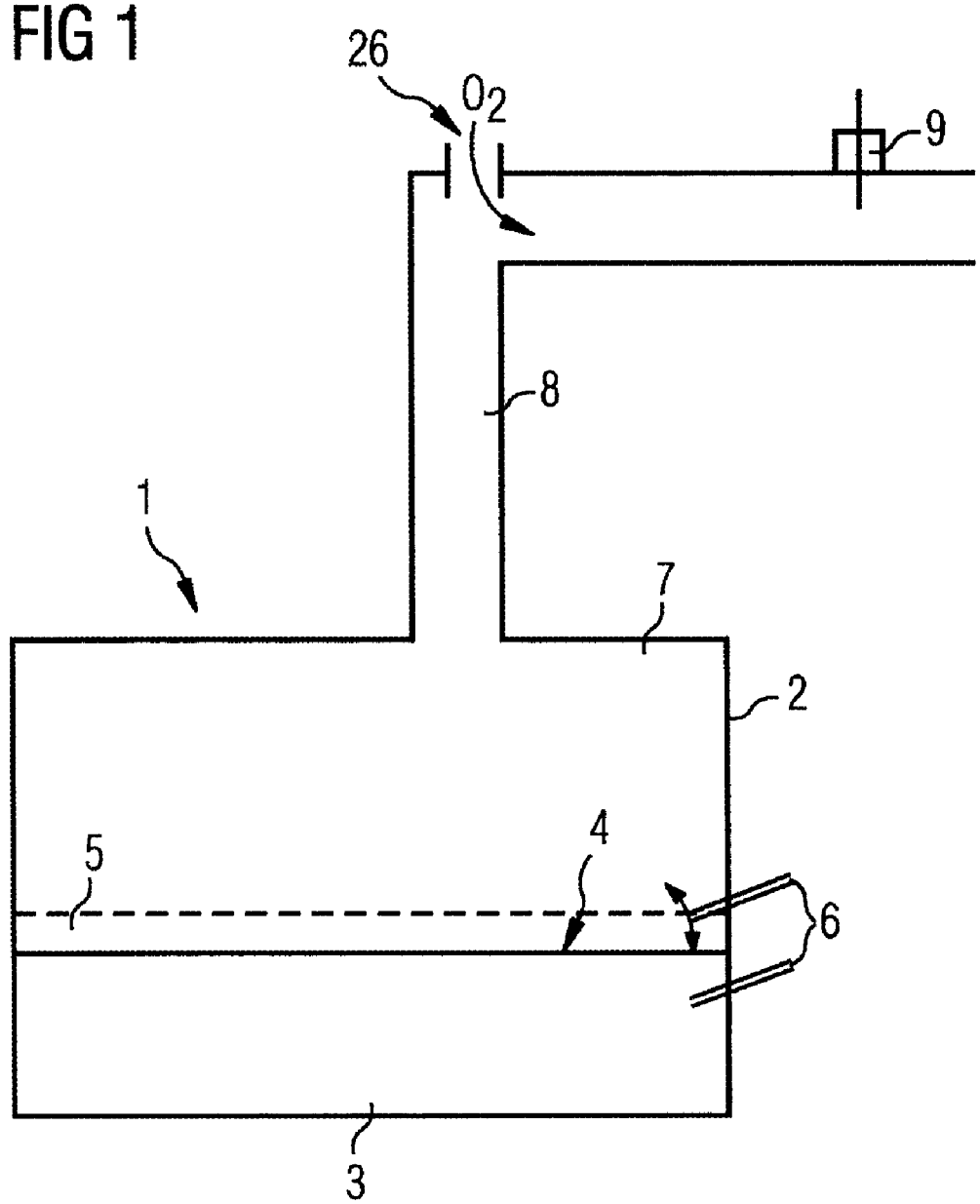

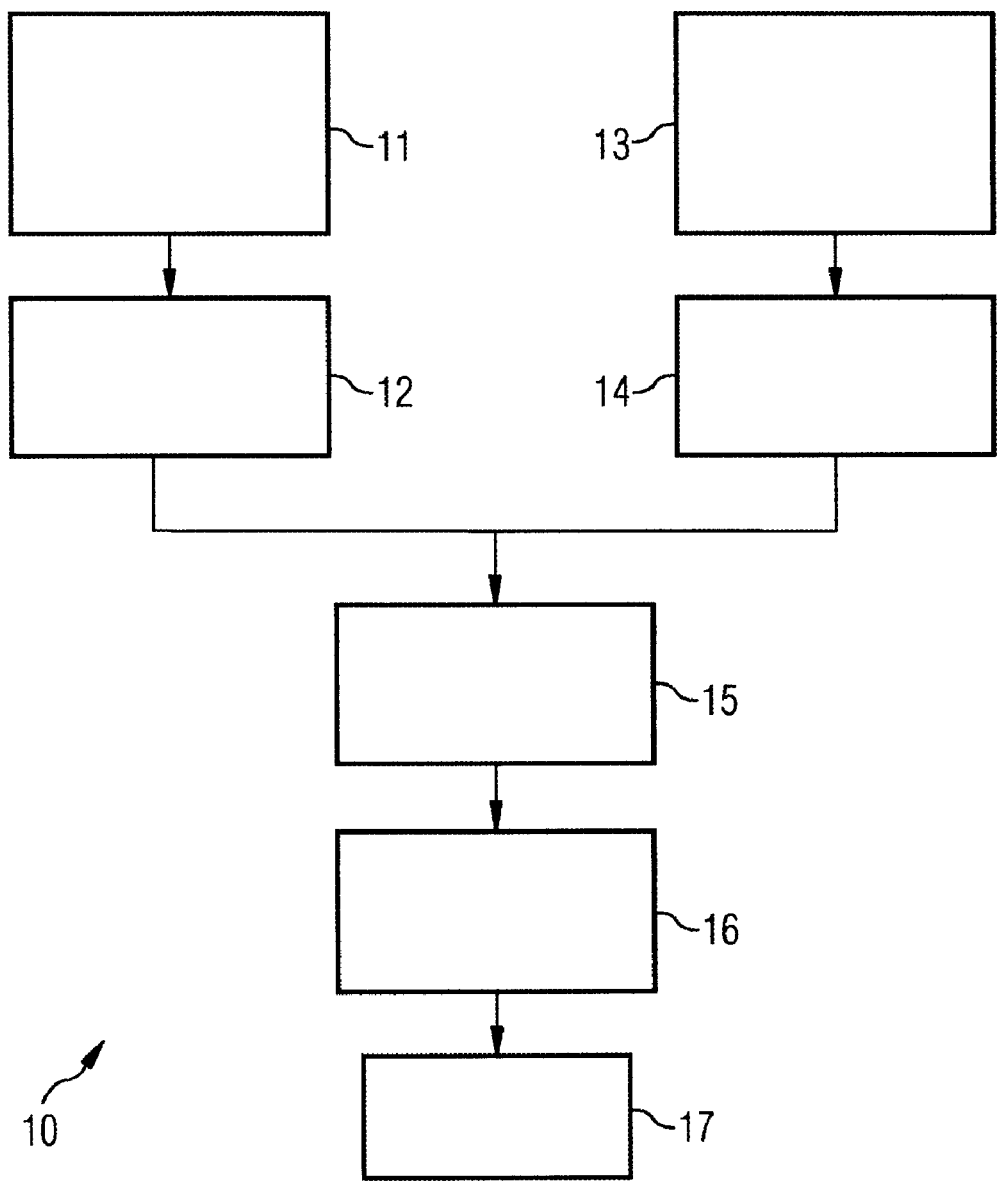

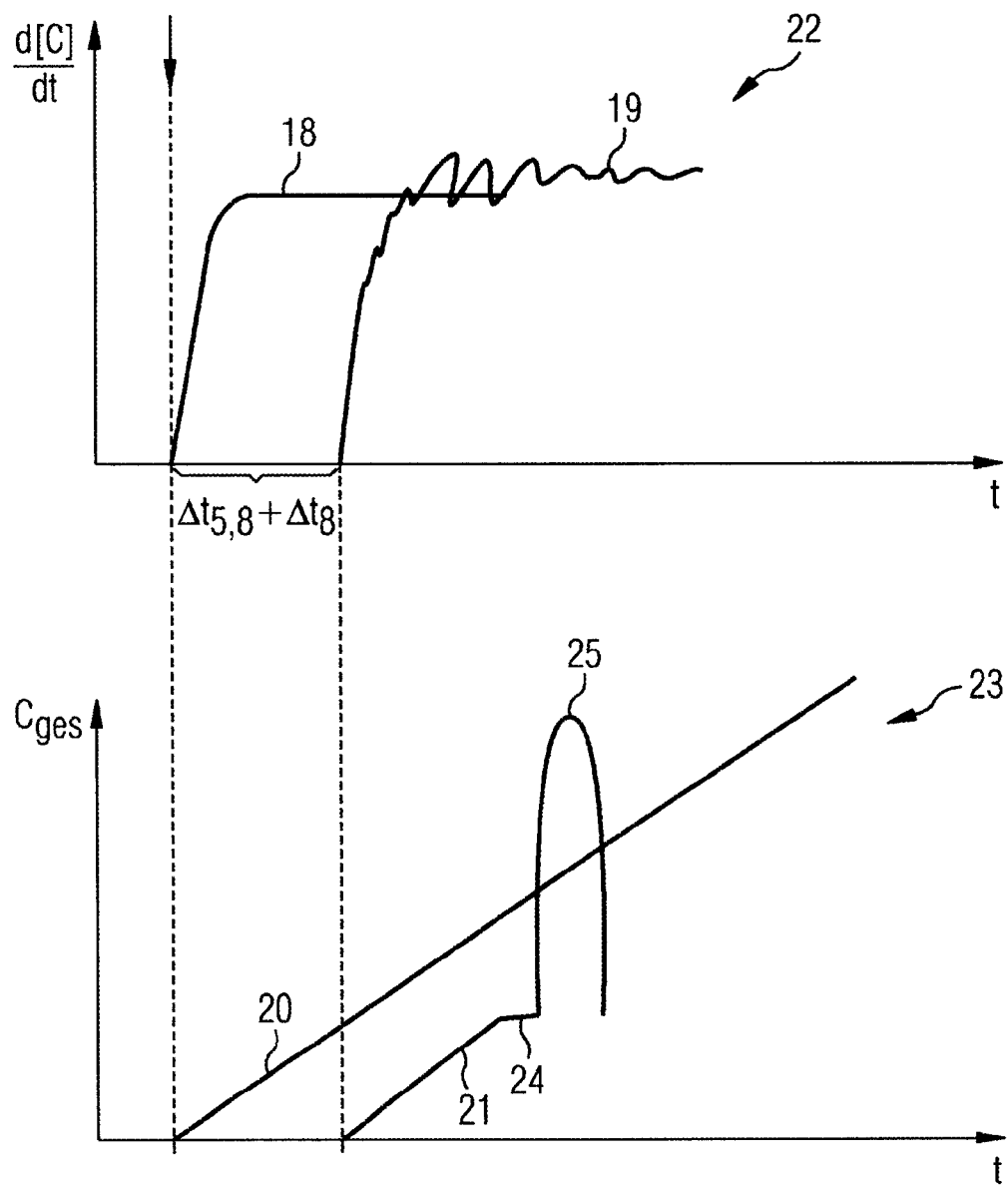

METHOD OF REGULATING THE OUTPUT OF CARBON MONOXIDE IN A METALLURGICAL MELTING PROCESS

CROSS-REFERENCE TO RELATED APPLICATIONS

This application is a United States national phase filing under U.S.C. §371 of International Application No. PCT/EP2007/059061, filed Aug. 30, 2007 which claims priority to German Patent Application No. 10 2006 050 888.2, filed Oct. 27, 2006. The complete disclosure of the above-identified application is hereby fully incorporated herein by reference.

TECHNICAL FIELD

The invention relates to a method of regulating the output of carbon monoxide in a metallurgical melting process.

BACKGROUND

To produce high-quality steel, the carbon content (C) of the starting raw material has to be reduced. The starting raw material can in this case partly be obtained from scrap which is firstly melted in an apparatus, for instance a converter or an electric arc furnace, and then decarburized. To carry out the decarburization, oxygen ($O_2$) is blown into the melt and oxidizes the carbon present in the melt. The carbon monoxide (CO) produced in this way forms gas bubbles in the melt and these rise to the surface of the latter and pass through the slag on the surface of the melt. In a gas space above the melt, carbon monoxide can be partly oxidized to carbon dioxide or completely oxidized by means of after-combustion devices. An offgas containing CO, $CO_2$ and also $H_2$, $H_2O$ and $N_2$ leaves the apparatus through an offgas outlet and primary gas is generally passed to a dust removal plant and a filter plant.

However, the formation profile of CO is not always proportional to the amount of oxygen blown in, which is attributable to the fact that the liquid melt is able, depending on the flow and temperature situation, to dissolve and retain the resulting CO in a metastable fashion. Sometimes there is no longer the necessary impulse for the CO gas collected in the melt to rise and the critical point at which the gas rises is reached only at an appropriate gas bubble size or induced only by secondary influences, e.g. flushing elements. The gas is then given off quite suddenly. This undesirable effect, known as boiling, can lead to a safety hazard and material damage to the apparatus and associated peripherals, for instance dust removal from the primary gas or a filter plant.

SUMMARY

According to various embodiments, a method of regulating the output of carbon monoxide in a metallurgical melting process can be provided, by means of which sudden release of carbon monoxide can be prevented or at least be reduced in intensity.

According to an embodiment, in a method of regulating the output of CO in steel production, oxygen is supplied to a melt to remove carbon present, wherein the method may comprise the steps of: determining the actual value of the carbon stream which is released from the melt, calculating the expected value of the carbon stream which results from the amount of oxygen fed in and the carbon content of the melt taking into account any other reactions, and comparing actual and expected values with one another, wherein in the case of the actual value being below the expected value carbon is supplied to the melt as measure for preventing boiling effects.

According to a further embodiment, the supply of oxygen to the melt may be controlled as measure. According to a further embodiment, the supply of oxygen may be reduced.

BRIEF DESCRIPTION OF THE DRAWINGS

The invention will now be illustrated with reference to the accompanying drawings. In the drawings, FIG. 1 shows a schematic sketch of an apparatus for the metallurgical melting process, FIG. 2 shows a flow diagram for the regulation of the metallurgical melting process and FIG. 3 shows characteristic curves for the metallurgical melting process.

DETAILED DESCRIPTION

According to various embodiments, the actual value of the carbon stream given off from the melt is determined and the expected value of the carbon stream released, which is determined by the amount of oxygen fed in and the carbon content of the melt taking into account any other reactions, is calculated and actual and expected values are compared with one another and in the case of the actual value being below the expected value, measures for preventing boiling effects are taken. Here, the carbon stream indicates the amount of the carbon released in the form of CO and/or $CO_2$ per unit time, for instance in kilograms per second. If the actual value remains below the theoretical value, this is a clear indication that accumulation of gases containing carbon monoxide in the melt is taking place and makes possible the timely initiation of suitable countermeasures to reduce or completely avoid the sudden rising of gas bubbles, viz. the undesirable boiling phenomenon. This also increases the operating safety of the apparatus.

The process mentioned can be employed, for example, in converters, AOD converters (argon-oxygen decarburization, AOD) and in particular in electric arc furnaces.

The actual value of the carbon stream can be determined from the analysis of the composition of the gases leaving the offgas outlet. Here, the carbon monoxide and carbon dioxide content can, for example, be determined by means of gas chromatography or laser-aided gas analysis.

The expected value of the carbon stream given off can be calculated, inter alia, from the amount of oxygen supplied to the melt and the carbon content of the melt. If appropriate, the amount of carbon introduced into an electric arc furnace to regulate the foam slag can also be taken into account here.

For operation of the apparatus, it can be particularly advantageous to have a very steady carbon stream which does not have any rapid fluctuations. Calculation of the expected value of the carbon stream and comparison with its actual value makes it possible to determine at any time whether accumulation of carbon monoxide is taking place in the melt. Evaluation of the comparison between actual value and expected value allows timely introduction of countermeasures. Here, the oxygen supply to the melt can be reduced or adjusted or else additional carbon can be introduced. The reduction in the oxygen supply firstly prevents the formation of further carbon monoxide. The additional introduction of carbon, on the other hand, can lead to direct formation of carbon monoxide bubbles which may induce further accumulations of gas to be evolved from the melt.

FIG. 1 shows a schematic sketch of an apparatus 1 for a metallurgical melting process. The apparatus 1 can be a converter, AOD converter, an electric arc furnace or a comparable apparatus, in particular for steel production.

The raw material which has been melted to form a melt 3 is present in a vessel 2 and is covered on the upper surface 4 by a slag layer 5. Oxygen or carbon can be supplied to the melt 3 through blow tubes 6 at a first point in time ($t_1$). In practical terms, at least the amount of oxygen fed in ($m_O$) is known. In the region of the melt 3, carbon and oxygen react to form carbon monoxide: $C+½O_2 \rightarrow CO$. In this way, the carbon originating from the molten raw material or carbon introduced via the blow tubes 6 can be oxidized. The carbon monoxide is firstly dissolved in the melt 3 or is retained therein in the form of fine gas bubbles and goes over at least partly into the gas phase, with gas bubbles rising to the upper surface 4 of the melt 3 and passing through the slag layer 5 so that the carbon monoxide is firstly given off into the gas space 7 above the slag layer. In the gas space 7, part of the carbon monoxide reacts with oxygen to form carbon dioxide: $CO+½O_2 \rightarrow CO_2$.

An offgas outlet 8 is located on the gas space 7 and through this the carbon-containing gases, inter alia, leave the gas space 7 of the apparatus 1. Oxygen ($O_2$) is sucked in through a slit 26 in the offgas outlet, as a result of which the offgases are subjected to after-combustion. They can be fed to a primary gas dust removal stage (not shown) and subsequently to a filter plant. A measurement facility 9 for analyzing the composition of the offgases leaving the apparatus 1 is located in the offgas outlet 8. In particular, the amounts of carbon-containing components in the offgas and from this the actual value ($v_{actual}$) of the carbon stream $$\frac{d[C]}{dt}$$

are determined at any desired point in time ($t_{meas}$).

FIG. 2 shows the flow diagram 10 of the method presented. In a step 11, a first carbon balance of the melt is calculated, for example, from the amount of oxygen supplied to the melt at a first point in time $t_1$ and the carbon present in the melt at this point in time.

An expected value $v_{Cexpected}$ of the carbon stream given off from the melt $$\frac{d[C]}{dt}$$

is calculated from this carbon balance in a step 12. Other processes such as oxidation of iron and silicon, inter alia, are taken into account here. The expected value $v_{Cexpected}$ can, for example, be measured in kilograms per unit time. In parallel to the determination of the expected value $v_{Cexpected}$ the composition of the offgases leaving the apparatus at a point in time $t_{meas}$ determined by means of the measurement facility 9 is analyzed in a step 13 and the actual value $v_{Cactual}$ of the carbon stream given off from the melt $$\frac{d[C]}{dt}$$

is calculated from the analysis in step 14. The point in time of the measurement $t_{meas}$ is advantageously selected when it follows the first point in time $t_1$ after elapse of the time difference $\Delta t_{5,8}$ from the formation of carbon monoxide in the melt 3 to the ascent of the carbon-containing gases formed to the measurement facility 9 in the offgas outlet 8 and of the period of time $\Delta t_8$ for measurement and analysis of the composition of the offgas by means of the measurement facility 9.

In step 15, the actual value $v_{Cactual}$ and expected value $v_{Cexpected}$ are compared taking into account the period of time $\Delta t_{5,8}+\Delta t_8$ elapsed between the first point in time $t_1$ and the point in time of the measurement $t_{meas}$. If the actual value $v_{Cactual}$ is smaller than the expected value $v_{Cexpected}$, this indicates accumulation of carbon monoxide in the melt. In a step 16, the deviation between actual value $v_{Cactual}$ and expected value $v_{Cexpected}$ is evaluated. If appropriate, an actual value $m_{Cactual}$ and an expected value $m_{Cexpected}$ of the amount of carbon given off since the commencement of introduction of oxygen at the point in time $t_0$ ($C_{tot}$) can also be determined. If the difference between actual value $v_{Cactual}$ and expected value $v_{Cexpected}$ exceeds a threshold value, countermeasures are taken in a step 17. The period of time $\Delta t_{8,4}$ required for steps 11 to 17 is the reaction time which is required for initiation of countermeasures comprising adjustment of the amount of oxygen or additional carbon supplied to the melt 3 via the blow tubes 6.

The functional principle of the method can be seen from the characteristic curves 18 to 21 of the graphs 22 and 23 in FIG. 3. Graph 22 shows the expected value $v_{Cexpected}$ in characteristic curve 18 and the actual value $v_{Cactual}$ in characteristic curve 19 of the carbon streams as a function of time. From the time of commencement $t_0$ of the introduction of oxygen into the melt 3 onward, the expected value $v_{Cexpected}$ can be calculated. The time which elapses until the amount of carbon present in the offgas given off is determined from measured values from the measurement facility 9 is the period of time $\Delta t_{5,8}+\Delta t_8$. The characteristic curve 18 shows the desired steady release of carbon in the case of the approximately constant or slowly decreasing expected value $v_{Cexpected}$ of the carbon stream. Ideally, the actual value $v_{Cactual}$ should follow the curve for the expected value with a delay of $\Delta t_{5,8}+\Delta t_8$. In actual fact, the carbon will not be given off as uniformly as this from the melt. This leads to a deviation of the characteristic curve 19 for the actual value $v_{Cactual}$ from the characteristic curve 18, with fluctuation about the characteristic curve 18 being tolerable within threshold values. If the carbon stream is integrated over time, the actual value $m_{Cactual}$ and expected value $m_{Cexpected}$ for the amount of carbon $C_{tot}$ given off from the melt since the point in time $t_0$ can be obtained therefrom. The characteristic curve 20 shows the course of the expected value $m_{Cexpected}$ corresponding to the characteristic curve 18 and the characteristic curve 21 of the actual value $m_{Cactual}$ corresponds to the characteristic curve 19. From a point in time $t_2$ onward, a flattening 24 of the characteristic curve 21 of the actual value $m_{Cactual}$ of the amount of carbon $C_{tot}$ is observed. This indicates that carbon monoxide is accumulated in the melt. If regulation is not carried out, the accumulation can ascend suddenly in a large gas bubble at a later, unforeseeable point in time $t_3$, which is shown in the characteristic curve 21 by the excessive increase 25. The method according to various embodiments makes it possible to recognize such a flattening 24 of the characteristic curve 21 by means of the evaluation of the actual value $v_{Cactual}$ and expected value $v_{Cexpected}$ of the carbon stream and allows initiation of appropriate countermeasures for preventing boiling effects.

The invention claimed is:

1. A method of regulating the output of CO in steel production, the method comprising the steps of:
supplying oxygen to a melt in a steel production process to remove carbon present,
determining an actual value of a carbon stream which is released from the melt,
determining an amount of oxygen supplied to the melt,
determining a carbon content of the melt,
calculating an expected value of the carbon stream based at least on the determined amount of oxygen supplied to the melt and the determined carbon content of the melt,
comparing the determined actual value of the carbon stream with the expected value of the carbon stream, and
based on the results of the comparison of the actual value of the carbon stream with the expected value of the carbon stream, determining whether to take a corrective measure, wherein the corrective measure includes either supplying additional carbon to the melt or adjusting the amount of oxygen supplied to the melt.

2. The method according to claim 1, wherein adjusting the amount of oxygen supplied to the melt comprises reducing the supply of oxygen to the melt.

3. The method according to claim 1, comprising:
determining a difference between the actual value of the carbon stream and the expected value of the carbon stream,
comparing the difference between the actual and the expected values of the carbon stream with a predetermined threshold, and
determining whether to take the corrective measure based on the results of the comparison between the difference between the actual and the expected values of the carbon stream with the predetermined threshold.

* * * * *